3 Sheets—Sheet 1.
G. GOBEL.
Distance and Velocity Recorder.
No. 202,433. Patented April 16, 1878.
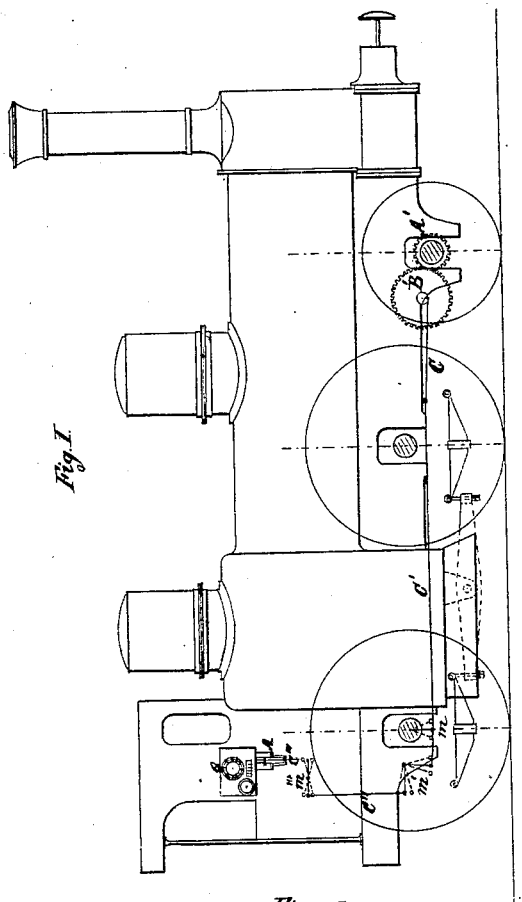
Witnesses. Inventor.

G. GOBEL.
Distance and Velocity Recorder.
No. 202,433. Patented April 16, 1878.
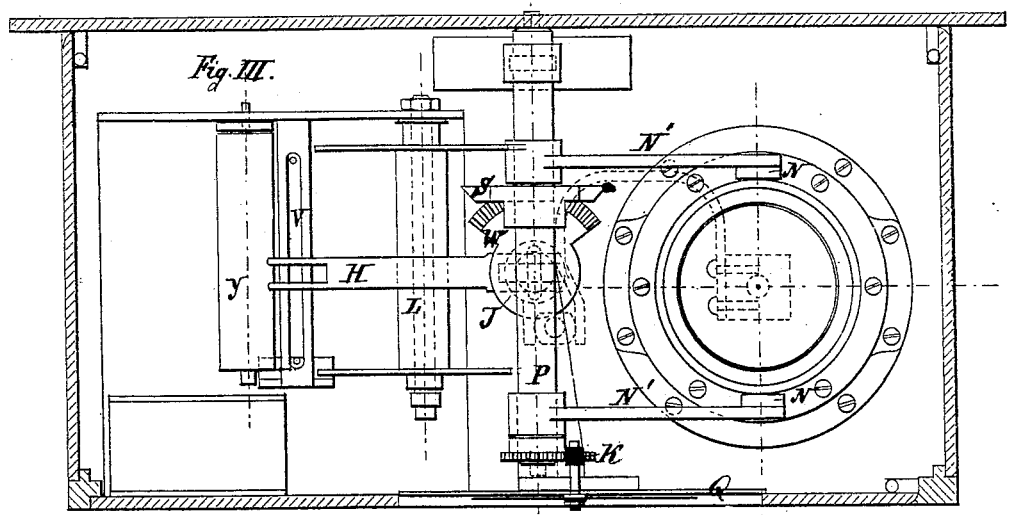
Fig. III.
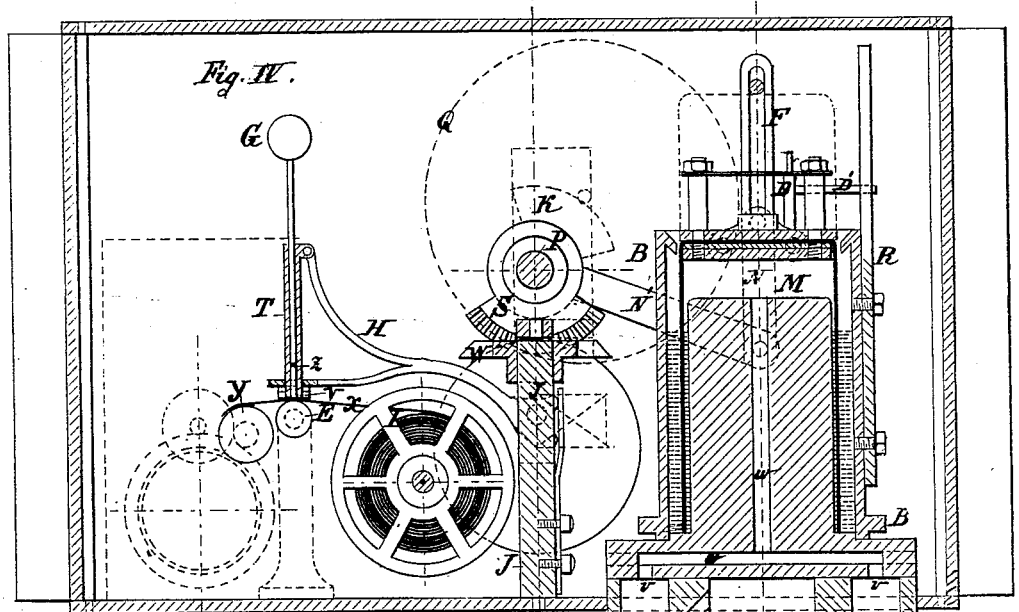
Fig. IV.
Fig. V.
½ of real size
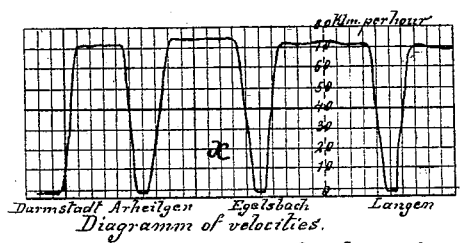
Darmstadt Arheilgen   Egelsbach   Langen
Diagramm of velocities.
Witnesses.
Earle H. Smith
Jno. D. Patten
Inventor.
Georg Göbel
Henry E. Roeder
attorney
N. PETERS, PHOTO-LITHOGRAPHER, WASHINGTON, D. C.

3 Sheets—Sheet 3
G. GOBEL.
Distance and Velocity Recorder.
No. 202,433. Patented April 16, 1878.
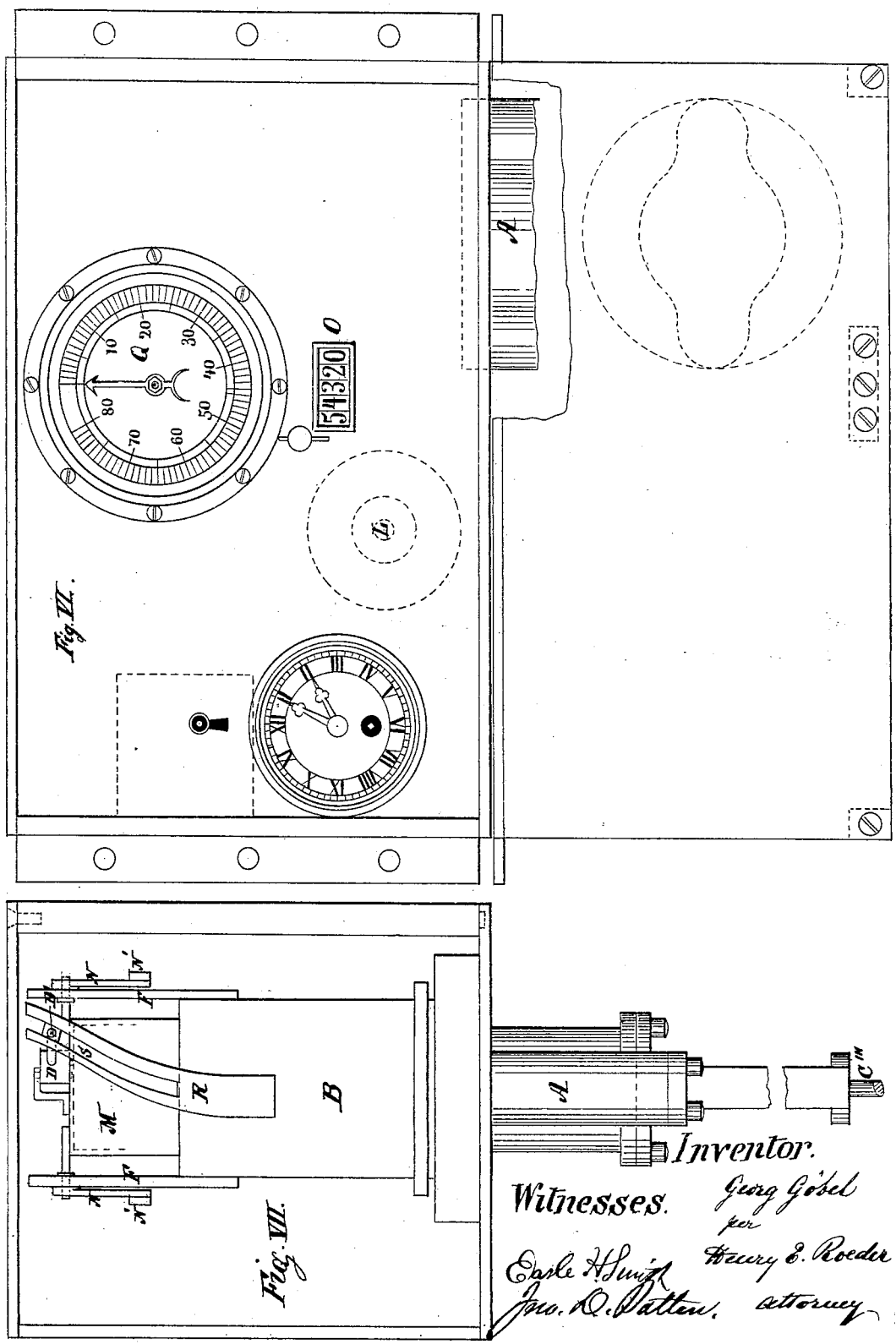

UNITED STATES PATENT OFFICE.

GEORG GÖBEL, OF DARMSTADT, GERMANY.

IMPROVEMENT IN DISTANCE AND VELOCITY RECORDERS.

Specification forming part of Letters Patent No. 202,433, dated April 16, 1878; application filed December 10, 1877.

*To all whom it may concern:*

Be it known that I, GEORG GÖBEL, of the city of Darmstadt, in the Empire of Germany, have invented a new and Improved Apparatus for Measuring Railway Velocities and Distances, which improvement is fully set forth in the following specification, reference being had to the accompanying drawings.

My invention consists in the construction of an apparatus whereby the velocity of the train will be shown to the engineer at every moment; secondly, whereby the state of velocity will be graphically shown at every moment in relation with the place where the train is at that time; third, indicating to the engineer at night, or during foggy weather, the time and the place where he is at every moment, thereby indicating to him whether he must increase or diminish the velocity of the train.

The apparatus, which is to be attached at any place most convenient to the engineer, such as under the roof of the engineer's house, consists of an exact and strong clock with clear dial-plate; second, an indicator of velocity, showing the state of the speed of the train from 0 (stop) to 80 kilometers per hour, (maximum velocity,) or any other desired measure; third, a register or counter, showing the number of kilometers made from the starting-station; fourth, a writing apparatus, indicating graphically upon a slip of paper the degree of velocity of the train in relation with place and time; fifth, a table showing the line of the road, with indication of the distances in kilometers from station to station. This table is separate from the apparatus and arranged in a frame (under glass) convenient to the engineer.

The measure here indicated is the French or decimal system; but it will readily be understood that any other arrangement of measure may be applied.

In the accompanying drawings, Figure I represents the arrangement of the apparatus on the locomotive-engine, and the mode of connecting and operating the same. Fig. II represents a table of a road from two cities, (Frankfort to Heidelberg,) indicating the stations and distances between the same. Fig. III is a top view, and Fig. IV a longitudinal section, of the apparatus. Fig. V represents a diagram of velocities at half natural size. Fig. VI shows a front view, and Fig. VII a side view, of the apparatus.

Similar letters represent similar parts in all the figures.

This apparatus is attached in the inside of the engineer's house or "cab", (see Fig. I,) and by suitable gearing connected with one of the axles. As shown in the drawing, a wheel, A', is fastened to the forward axle of the locomotive, which gears into a wheel, B', twice as large as the wheel A'. A crank-pin is attached to this wheel B', from which the desired motion is communicated to the air-pump A of the apparatus through connecting rods C C', bell-crank $m$ $m'$, rod $c''$, and lever $m''$. The wheel A' is attached to the axle of the leading-wheels, in preference, for the reason that the same do not slip on the rails, which often occurs with the driving-wheels when the rails are greasy from moisture or ice.

The rotary motion of the axle puts the apparatus in motion by the intermediate action of the air-pump A. This air-pump (see Fig. IV) is double-acting. The air delivered by the pump enters, through the channels $v$ and $w$, into a floating bell, M, that swims like a gasometer, but in mercury, instead of in water, contained in the annular space of the cast-iron case B. The latter is filled to three-fourths of its height. As soon as the locomotive, and with it the air-pump A, begins to move, air is pressed below the bell and lifts it. The compressed air leaves the bell through an opening in its top, covered by a vibrating or sliding valve, D, through which the opening or outlet is automatically regulated according to the higher or lower position of the bell—that is to say, by the rising of the pressure.

The regulating of this outlet is effected by a horizontal arm, D', attached to the valve D, turning on a suitable center. (See Fig. VII.) This arm D' is guided in a diagonal slot, $s$, in the bar R, attached to the cylinder B. The slot $s$, being formed to a certain curve, turns the valve D through a certain angle as the bell is rising or sinking, thereby regulating the opening and closing of the outlet. The lowest position of the bell corresponds to a velocity 0, the highest to a velocity 80, (eighty kilometers per hour,) the supposed maximum.

The bell M is provided on both sides with suitable projections, working in guides F, to give a steady motion to the bell. The projections are connected by means of the levers N with the levers N', fast on the horizontal axis P. On this axis P is likewise fastened a lever, with a counter-weight to balance the bell, so arranged that when the bell is at its lowest position said weight will hang vertically below the axis P, and rising by degrees as the bell rises, balancing thereby and regulating the pressure under the bell.

The different positions of the bell, between its lowest and highest positions, indicate the increasing velocity from 0 to 80 kilometers per hour.

The horizontal axis P transmits its oscillation by means of the conical gearing K to the handle of the dial-plate Q of the speed-indicator.

The velocity indicated by the position of the bell M between 0 and 80 kilometers is distinctly marked and recorded on an endless paper, X. This paper X is wound upon a roller, L, and attached to a roller, Y, connected with and operated by the clock-work, so as to wind the same off at a speed of about from five to seven millimeters per minute, passing over a cylinder or other suitable surface, E.

On the horizontal axis P a conical wheel, S, is attached, meshing into a corresponding wheel, W, fast to the vertical axis J. To this axis J a lever, H, is attached, having on its fore end a hinged socket, T, through which a pencil, Z, is fitted, provided with a suitable weight, G, to cause the pencil to press continually and with safety upon the paper. The lower end of the hinged socket T is guided in a suitable groove, V, situated directly over the surface or cylinder E. The motion of the pencil being regulated and controlled by the motion of the bell M, every position of the same corresponds to a special velocity between 0 and 80 kilometers per hour.

The paper X is marked with equidistant lines in both directions. The longitudinal lines indicate velocities from 10 to 10 kilometers. When the locomotive is standing still the point of the pencil Z will stand on the first line, marked 0; and when the locomotive is running, and has reached its maximum speed, the point of the pencil will stand on the last line, marked 80.

The paper being regularly and continually drawn by the clock-work, the pencil draws a straight line on line 0 during a stoppage of the train. As the locomotive begins to move the increasing velocity is marked by a slanting line until the velocity becomes steady, when it is marked again by a straight line. Decrease of the velocity is shown by a line returning by degrees to the 0-line. Fig. V shows a diagram of this description, with the velocity-lines of a locomotive on a trial-trip.

By means of this diagram the officials of the railway are able to see when the train arrived at every station, when it left the same, how long it was stopped at the station, what his velocity was at any time, when it moved at a regular velocity, what changes of velocity took place during the running, and if these changes were slow or rapid. By an easy calculation they can also ascertain at what place of the line every change of velocity happened.

Under the dial-plate Q of the speed-indicator a revolution-register, O, is arranged. The same may be operated from the lever $m'''$, or any other part of the locomotive. The same is preferably so arranged that, if the wheel of the locomotive has a periphery of four meters, the counter-wheel of the register shall make one revolution for ten revolutions of the wheel, or for every forty meters traveled by the locomotive. If, at starting, the counter was put at 0, the locomotive will have passed over the first kilometer as the register shows the number 25. The second kilometer will correspond to number 50, the third to number 75, &c. At number 54,125 the locomotive will have made two thousand one hundred and sixty-five kilometers.

If the register is to be practically used, its results must be compared with the diagram, as represented in Fig. II, indicating the stations and distances corresponding with the numbers presented by the counter-wheels of the register. On the same diagram the names of the stations are printed at the points where the numbers correspond with their relative distances. By comparing the numbers indicated by the register at any moment with the position of the pencil on the diagram, Fig. II, the engine-driver is enabled, even at night and during foggy weather, to ascertain the spot of the line where he is at that time, and thus to judge whether he has to increase or to diminish the speed of the locomotive.

If after repairing the locomotive, or by any change of its wheels, their periphery has been altered, the numbers on the table (shown in Fig. II) must be altered to correspond to the circumference of the new wheels.

What I claim as my invention, and desire to secure by Letters Patent, is—

1. In combination with the air-pump A, the bell M, immersed in mercury, and provided with an outlet on the top, regulated by a sliding or vibrating valve, D, in the manner and for the purpose substantially as set forth.

2. The valve D, covering the outlet on top of the bell M, with arm D', in combination with a diagonal slot, s, in the stationary arm R, arranged to operate substantially as and for the purpose described.

3. The combination of an immersed bell, M, with a dial, Q, indicating the velocity corresponding with the position of said bell, substantially in the manner specified.

4. The bell M, levers N N', shafts P and J, and arm H, with pencil at its end, in combination with an endless strip of paper, X, having a uniform motion, arranged to operate together in the manner and for the purpose substantially as set forth and described.

5. The hinged socket T at the end of the arm H, provided with a weighted pencil, Z, in combination with the guiding-groove V, for the purpose specified.

GEORG GÖBEL.

Witnesses:
PETER BARTHEL,
LOUIS BASSE.